(12) United States Patent
Choi et al.

(10) Patent No.: US 11,407,059 B2
(45) Date of Patent: Aug. 9, 2022

(54) FRICTION STIR WELDING (FSW) TOOL WITH ADJUSTABLE PROBE LENGTH AND SHOULDER GROOVE DEPTH

(71) Applicant: ANDONG NATIONAL UNIVERSITY INDUSTRY-ACADEMIC COOPERATION FOUNDATION, Gyeongsangbuk-do (KR)

(72) Inventors: Sung Jong Choi, Daegu (KR); Ho Chan Kim, Gyeongsangbuk-do (KR)

(73) Assignee: ANDONG NATIONAL UNIVERSITY INDUSTRY-ACADEMIC COOPERATION FOUNDATION, Gyeongsangbuk-do (KR)

( * ) Notice: Subject to any disclaimer, the term of this patent is extended or adjusted under 35 U.S.C. 154(b) by 0 days.

(21) Appl. No.: 17/173,111

(22) Filed: Feb. 10, 2021

(65) Prior Publication Data

US 2021/0402505 A1 Dec. 30, 2021

(30) Foreign Application Priority Data

Jun. 30, 2020 (KR) .......................... 10-2020-0079697

(51) Int. Cl.
*B23K 20/00* (2006.01)
*B23K 20/12* (2006.01)
(52) U.S. Cl.
CPC ................ *B23K 20/1255* (2013.01)
(58) Field of Classification Search
CPC ............. B23K 20/122; B23K 20/1245; B23K 20/125; B23K 20/127; B23K 20/123; B23K 20/1255; B23K 20/129; B23K 20/002
See application file for complete search history.

(56) References Cited

U.S. PATENT DOCUMENTS 8,567,032 B2 * 10/2013 de Traglia Amancio Filho .......... B23K 20/129
29/283.5
8,950,650 B2 * 2/2015 Okada ................ B23K 20/1245
228/2.1

(Continued)

FOREIGN PATENT DOCUMENTS

KR 10200080057965 A 6/2008
KR 1020140087406 A 7/2014

(Continued)

OTHER PUBLICATIONS

Grant of Patent (Notice of Allowance), App. No. KR10-2020-0079697, dated May 26, 2021, 5 Pages.

*Primary Examiner* — Erin B Saad
(74) *Attorney, Agent, or Firm* — Berkeley Law & Technology Group, LLP

(57) ABSTRACT

Disclosed is a friction stir welding tool with an adjustable probe length and shoulder groove depth, wherein a support shaft, made of a material having low thermal conductivity so as to inhibit thermal conduction between a probe and a shank, is coupled to the center of an upper locking member together with the shank, the probe and inner and outer shoulders are coupled inside a lower part of the upper locking member, and a lower locking member is fastened and fixed to the lower part of the upper locking member, and a washer and a locking nut are fastened to an upper part of the lower locking member, whereby the locking nut pushes the lower locking member via the washer.

4 Claims, 5 Drawing Sheets

(56) References Cited

U.S. PATENT DOCUMENTS

| | | | |
|---|---|---|---|
| 9,095,926 B2* | 8/2015 | Okada | B23K 20/125 |
| 9,120,139 B2* | 9/2015 | Yamanoi | B21J 5/12 |
| 9,302,343 B2* | 4/2016 | Kumagai | B23K 20/126 |
| 11,045,898 B2* | 6/2021 | Haruna | B23K 20/1255 |
| 2002/0179682 A1* | 12/2002 | Schilling | B23K 20/1245 |
| | | | 228/2.1 |

FOREIGN PATENT DOCUMENTS

| | | |
|---|---|---|
| KR | 101471319 B1 | 12/2014 |
| KR | 102109654 B1 | 5/2020 |
| WO | 2008082420 A1 | 7/2008 |

\* cited by examiner

[FIG. 1]
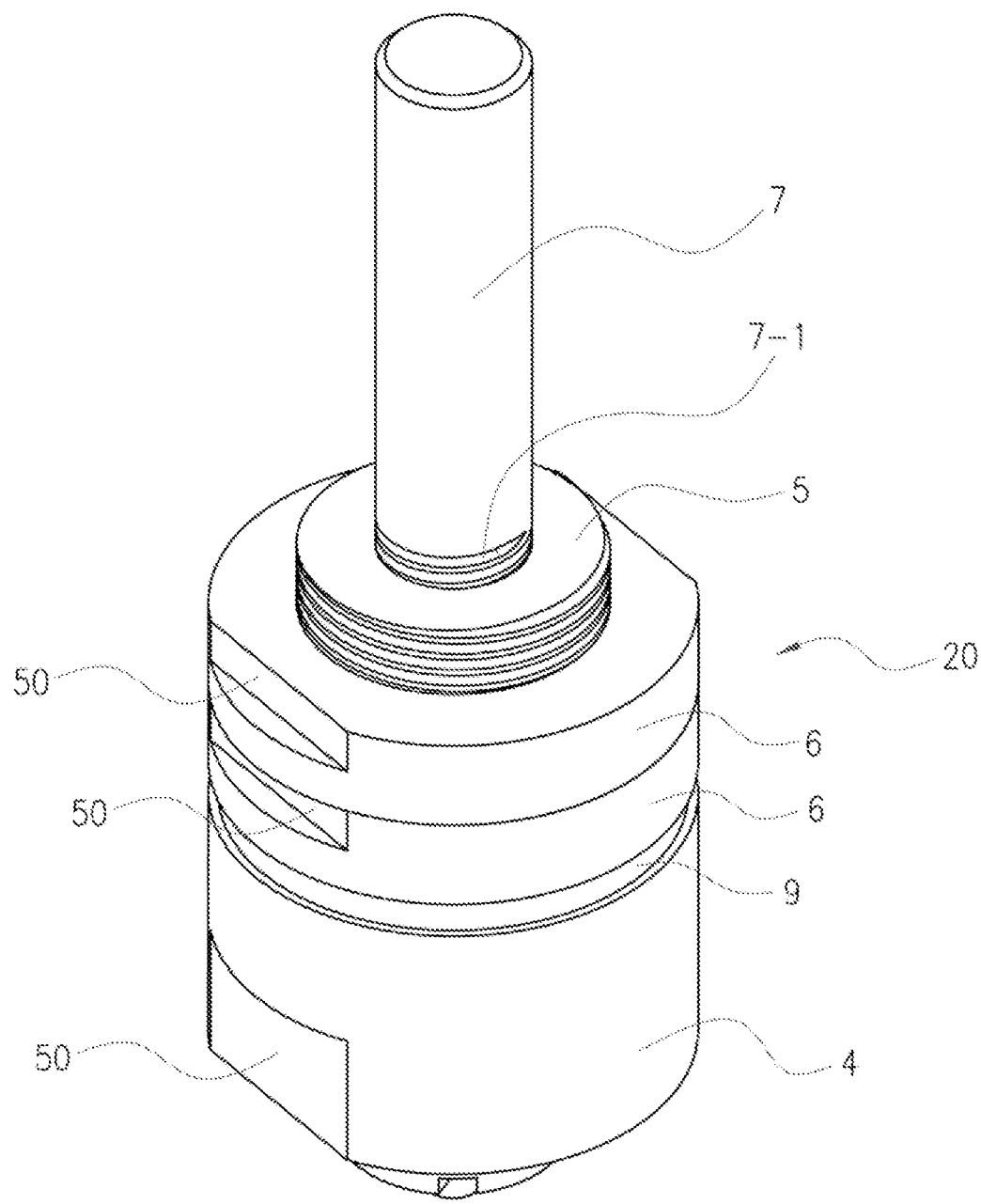

[FIG. 2]
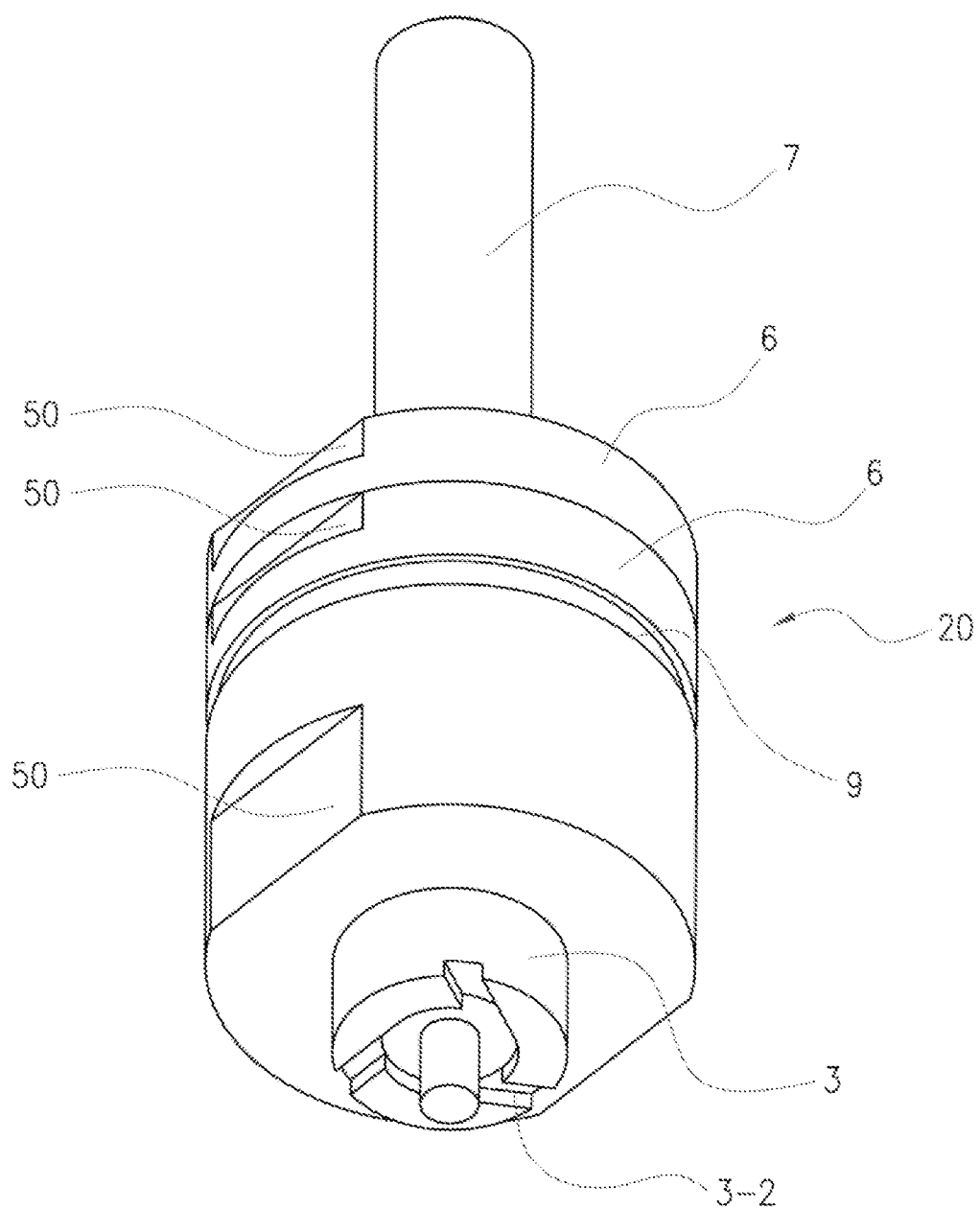

[FIG. 3]
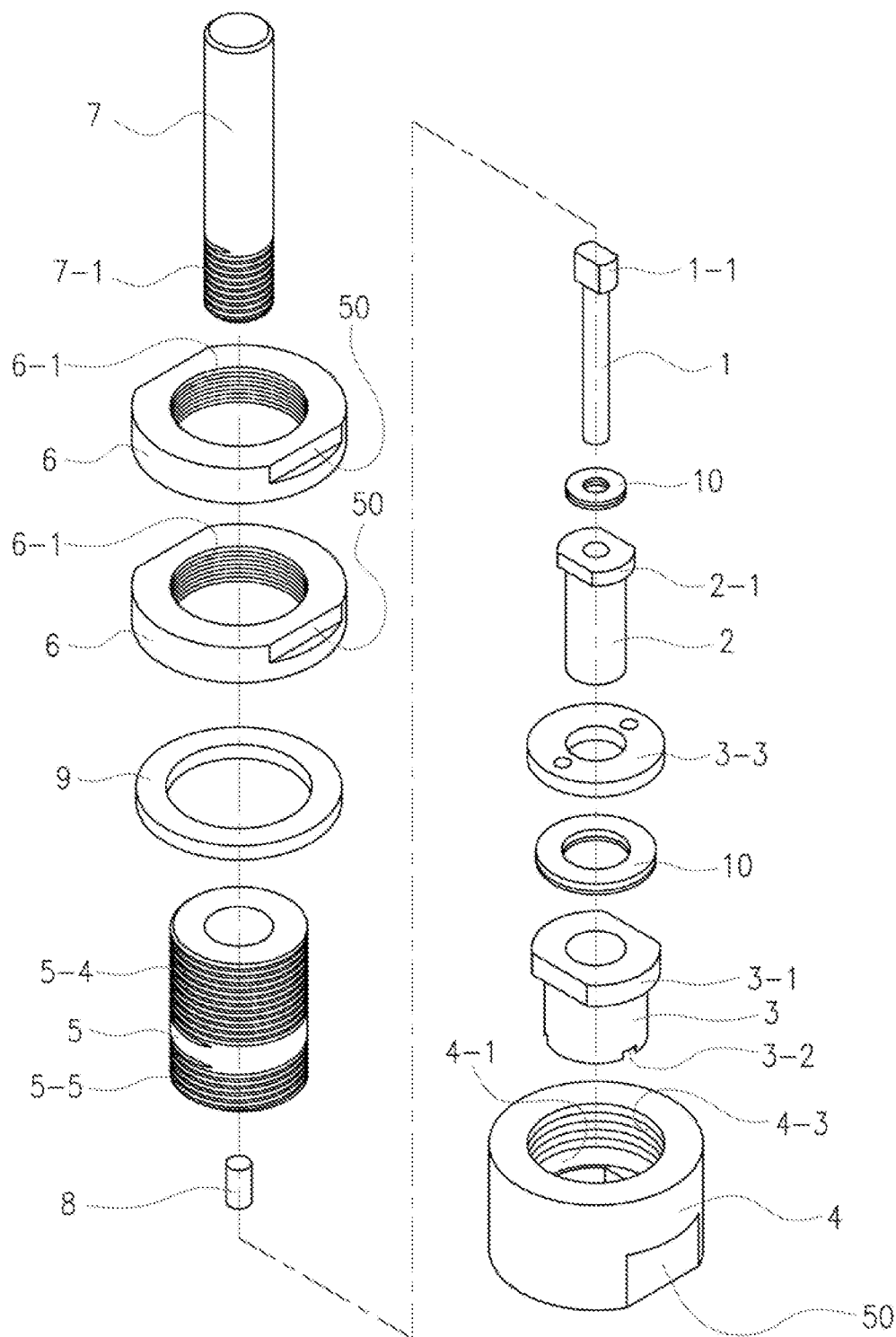

[FIG. 4]
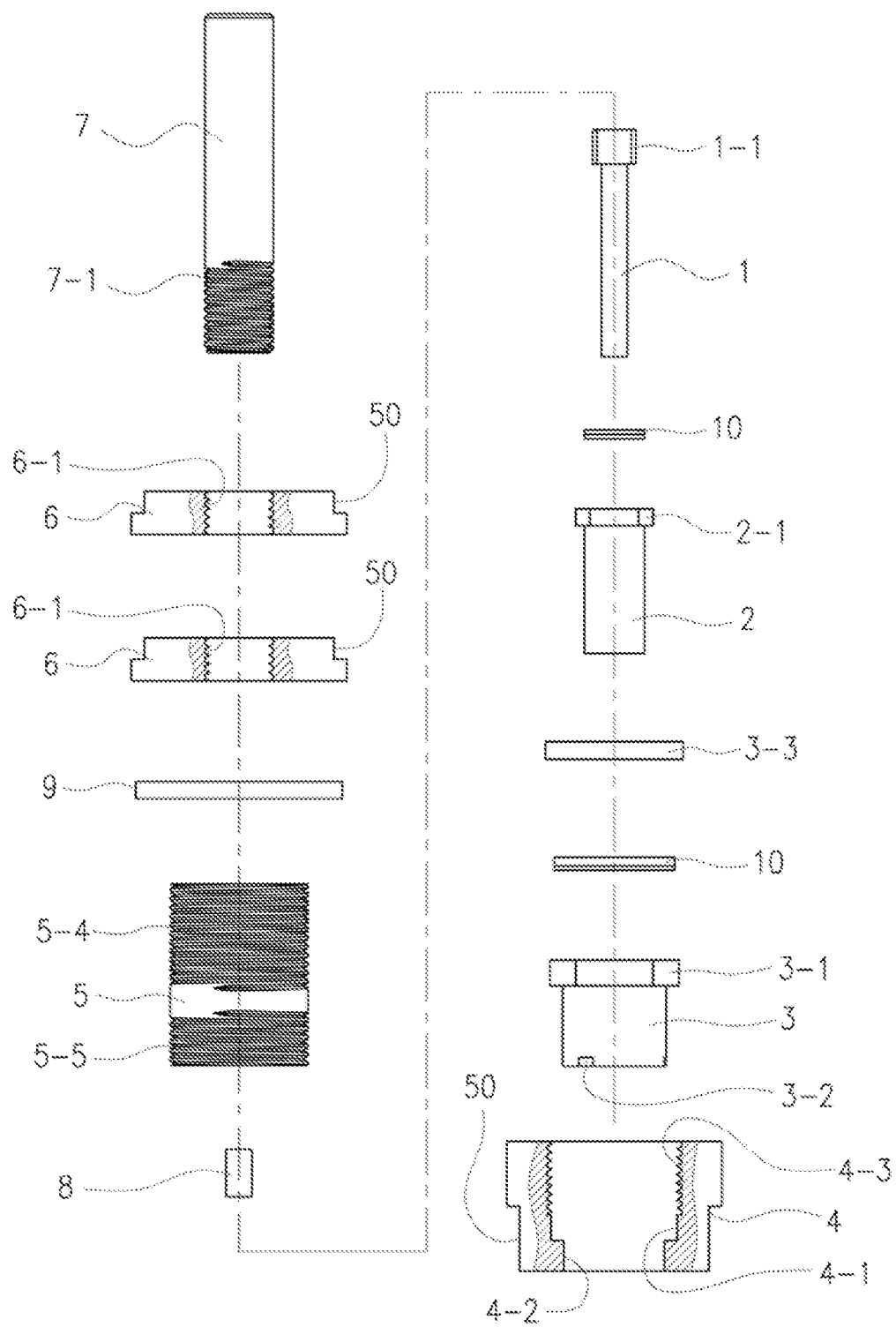

【FIG. 5】
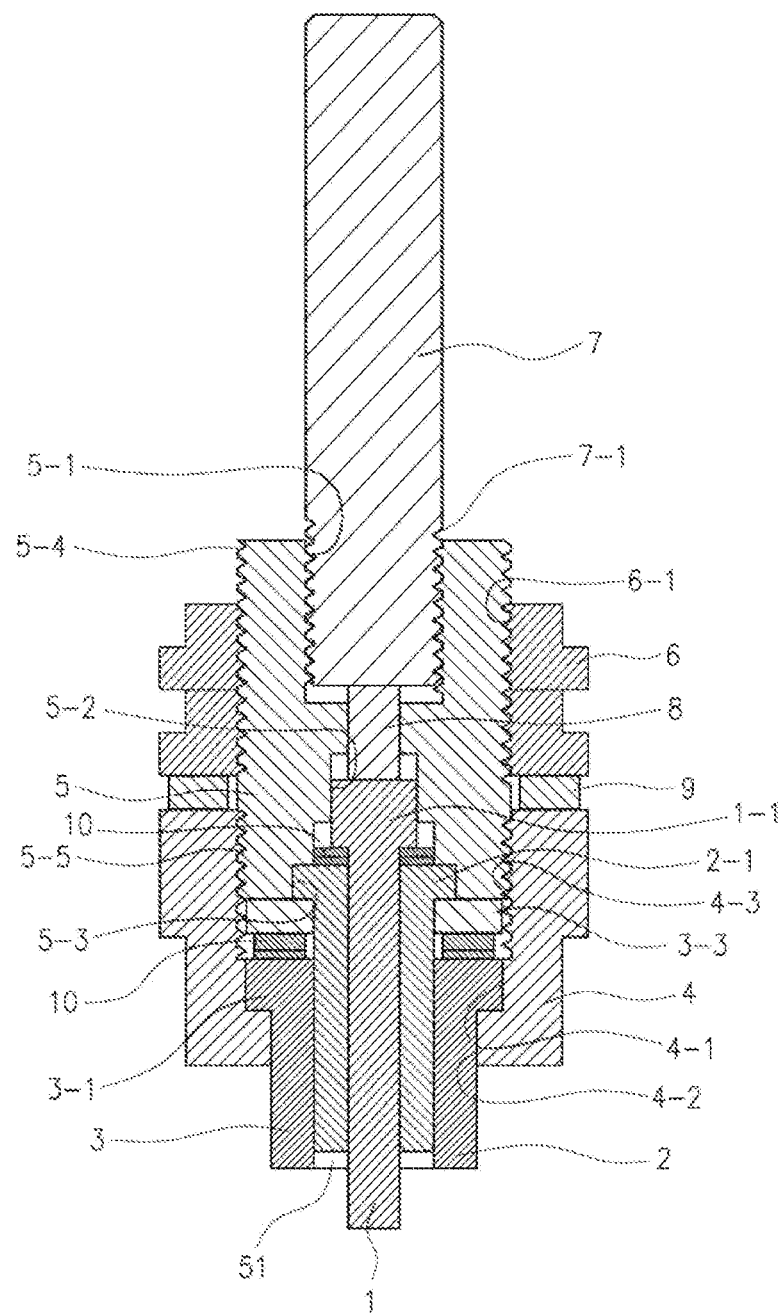

FRICTION STIR WELDING (FSW) TOOL WITH ADJUSTABLE PROBE LENGTH AND SHOULDER GROOVE DEPTH

BACKGROUND OF THE INVENTION

Field of the Invention

The present invention relates to a friction stir welding (FSW) tool with an adjustable probe length and shoulder groove depth, and more particularly to a friction stir welding tool capable of accelerating plastic flowability of a material to be stirred in a friction stir welding process and rapidly correcting and replacing a probe and a shoulder when the probe and the shoulder are worn.

Description of the Related Art

As is generally known, welding is a method of joining two or more materials to each other. Arc welding, oxygen welding, spot welding, friction welding, and friction stir welding are generally used.

Among the above welding methods, friction stir welding is characterized in that welding is performed using a tool constituted by a shoulder and a probe. In the state in which two materials to be joined to each other are brought into contact with each other or are disposed so as to overlap each other, the probe constituting the tool is brought into tight contact with a joint line therebetween, the tool is rotated until sufficient heat is generated, the temperature of the materials reaches a melting point by friction heat, whereby plastic flowability is secured, and the materials are joined to each other. That is, friction stir welding is a kind of solid joint welding.

The tool used to perform friction stir welding may have various configurations. For cost reduction, however, the shoulder and the probe are integrally manufactured. The tool is made of hot tool steel and has a structure in which a spiral groove is formed in the surface of the shoulder by mechanical processing. Such a tool has low high-temperature wear resistance. As a result, a relatively low melting-point metal material, such as aluminum, is restrictively used as a friction stir welding target. In addition, the shoulder and the probe are inevitably worn by friction occurring at the time of friction stir welding, and therefore the tool must be frequently replaced in order to maintain weld quality.

In the case in which the friction stir welding target is a material that exhibits high strength at high temperature and a high melting point, such as an iron-and-steel alloy, stainless steel, tool steel, or a titanium alloy, hot tool steel cannot be used as the material for the tool. As a result, each of the probe and the shoulder is made of a material superior to the target material in terms of strength at high temperature, hardness, and high-temperature wear resistance, such as a Co alloy, W-based cemented carbide, a ceramic material, or polycrystalline cubic boron nitride (PCBN).

Among the above materials, PCBN is known as being best. However, PCBN is very expensive, whereby replacement costs increase. As a result, economic efficiency is low, and therefore mass production is impossible.

PRIOR ART DOCUMENTS

Patent Documents (Patent Document 0001) Korean Patent Application Publication No. 10-2008-0057965 (Published on Jun. 25, 2008)
(Patent Document 0002) Korean Patent Application Publication No. 10-2014-0087406 (Published on Jul. 9, 2014)

SUMMARY OF THE INVENTION

The present invention has been made in view of the above problems, and it is an object of the present invention to rapidly adjust the length of a probe, i.e. the length of the probe relative to a shoulder, at any time, whereby homogeneous friction stir welding and friction stir treatment are possible.

It is another object of the present invention to adjust the depth of a groove of the shoulder at any time, whereby it is possible to derive optimum friction stir welding and friction stir treatment operation conditions, and therefore it is possible to improve weld quality.

It is another object of the present invention to provide a tool configured to be independently replaced in the case in which critical dimensions are excessively changed as the result of wear of and damage to the shoulder and the probe due to continuous operation.

It is a further object of the present invention to provide a shoulder and a probe configured to have a self-locking structure, rather than a thread-fastening system, as an assembly/fastening structure thereof, whereby each of the shoulder and the probe is made of a high-hardness material, such as a Co alloy, W-based cemented carbide, a ceramic material, or PCBN.

In accordance with the present invention, the above and other objects can be accomplished by the provision of a friction stir welding tool configured such that a male thread portion formed on a shank is fastened to a female thread portion formed in the center of an upper locking member and such that a probe head and an inner shoulder head are coupled to mounting grooves formed in the upper locking member through a self-locking structure.

An outer shoulder head may be coupled to a mounting groove of a lower locking member having a female thread portion configured to be fastened to the upper locking member, an outer shoulder may be exposed through a hole configured to expose the outer shoulder, and the female thread portion may be fastened to a right-hand thread portion of the upper locking member.

In order to prevent loosening of the lower locking member fastened as described above, two locking nuts, each having a female thread portion, and a washer may be fastened to a left-hand thread portion of the upper locking member.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view of a friction stir welding tool according the present invention;

FIG. 2 is a bottom perspective view of the friction stir welding tool according the present invention;

FIG. 3 is an exploded perspective view of the friction stir welding tool according the present invention;

FIG. 4 is an exploded front view of the friction stir welding tool according the present invention; and FIG. 5 is an assembled sectional view of the friction stir welding tool according the present invention.

DETAILED DESCRIPTION OF THE INVENTION

Hereinafter, the construction of a friction stir welding tool with an adjustable probe length and shoulder groove depth according to the present invention will be described in detail with reference to the accompanying drawings.

The friction stir welding tool 20 according to the present invention includes:

a shank 7 having a male thread portion 7-1, configured to be fastened to an upper locking member 5, formed thereon and a support shaft 8 coupled to the upper locking member 5, the support shaft 8 being disposed between a probe 1 and the shank 7 to push the probe 1, the support shaft 8 being made of a material having low thermal conductivity in order to inhibit thermal conduction between the probe 1 and the shank 7;

the upper locking member 5 having a female thread portion 5-1, to which the male thread portion 7-1 formed on the shank 7 is fastened, formed therein, mounting grooves 5-2 and 5-3, to which a probe head 1-1 and an inner shoulder head 2-1 are coupled, respectively, formed therein, and a left-hand thread portion 5-4 and a right-hand thread portion 5-5, to which locking nuts 6 and a lower locking member 4 are fastened, respectively, formed thereon;

the probe 1 having the probe head 1-1 formed thereon, an inner shoulder 2 having the inner shoulder head 2-1 formed thereon, and an outer shoulder 3 having an outer shoulder head 3-1 formed thereon and a plurality of recesses 3-2 formed in the surface thereof such that a material is continuously introduced and pushed during a friction stir welding operation;

the probe 1 and the inner shoulder 2 being configured to be separated from each other, plates 10 having various thicknesses of 1 mm or less such that lengths of the probe 1 and the inner shoulder 2 are independently adjustable, and a plate 3-3 configured to push the outer shoulder 3;

the lower locking member 4 having a mounting groove 4-1, to which the outer shoulder head 3-1 is mounted, a hole 4-2 configured to expose the outer shoulder 3, and a female thread portion 4-3, configured to be fastened to the upper locking member 5, formed therein; and two locking nuts 6 and a washer 9 provided in order to prevent loosening of the lower locking member 4, each of the locking nuts 6 having a female thread portion 6-1 configured to be fastened to the upper locking member 5.

In the friction stir welding tool formed as the result of assembly of the above components constituting the friction stir welding tool, the male thread portion 7-1 formed on the shank 7 is fastened to the female thread portion 5-1 to push the support shaft 8 after the support shaft 8 is coupled to the center of the upper locking member 5, and the probe head 101 and the inner shoulder head 2-1 are coupled respectively to the mounting grooves 5-2 and 5-3 formed in the upper locking member 5 through a self-locking structure (bolt heads and wrench grooves).

That is, the mounting groove formed in each of the upper locking member 5 and the lower locking member 4 is a wrench groove, and each of the probe head, the inner shoulder head, and the outer shoulder head is a bolt head configured to be rotated together with the upper locking member 5.

The outer shoulder head 3-1 is coupled to the mounting groove 4-1 of the lower locking member 4 having the female thread portion 4-3, configured to be fastened to the upper locking member 5, formed therein, the outer shoulder 3 is exposed through the hole 4-2 configured to expose the outer shoulder 3, and the female thread portion 4-3 is fastened to the right-hand thread portion 5-5 of the upper locking member 5.

In order to prevent loosening of the lower locking member 4 fastened as described above, the two locking nuts 6, each of which has the female thread portion 6-1, and the washer 9 are fastened to the left-hand thread portion 5-4 of the upper locking member 5.

Unexplained reference numeral 50 indicates wrench coupling portions, and unexplained reference numeral 51 indicates a groove.

Hereinafter, the operation of the friction stir welding tool with the adjustable probe length and shoulder groove depth according to the present invention constructed as described above will be described in detail.

First, the inner shoulder, the probe, and the outer shoulder constituting the friction stir welding tool are assembled to the upper locking member 5 and the lower locking member 4 through an improved self-locking structure, rather than a thread-fastening system. Consequently, each of the inner shoulder, the probe, and the outer shoulder may be made of a high-hardness material, such as a Co alloy, W-based cemented carbide, a ceramic material, or polycrystalline cubic boron nitride (PCBN). Consequently, even in the case in which a friction stir welding target is a material that exhibits high strength at high temperature and a high melting point, such as an iron-and-steel alloy, stainless steel, tool steel, or a titanium alloy, it is possible to derive friction stir welding and friction stir treatment operation conditions, and therefore it is possible to improve weld quality.

In the case in which the probe 1 and the inner shoulder 2 are worn as the result of the friction stir welding and friction stir treatment operation being continuously performed and thus it is necessary to adjust the lengths of the probe 1 and the inner shoulder 2, the two locking nuts 6 and the washer 9 fastened to the upper locking member 5 are unfastened therefrom, the lower locking member 4 is unfastened, one or two of the plates 10 having various thicknesses of 1 mm or less are removed, the lower locking member 4 is fastened again, and the two locking nuts 6 are fastened to the upper locking member 5 in order to prevent loosening of the lower locking member 4.

As described above, a step with the inner shoulder 2 is allowed such that the groove 51 is formed between the probe 1 and the inner shoulder 2. At the time of friction stir welding, therefore, it is possible to increase pushing force necessary for plastic flow of the material in the upward-downward direction, and therefore it is possible to improve weld quality.

In addition, at the time of friction stir welding, the material is continuously introduced and pushed due to the plurality of recesses 3-2 formed in the surface of the outer shoulder 3, and therefore it is possible to improve weld quality.

Furthermore, in the case in which it is necessary to replace the probe 1 and the inner shoulder 2, the two locking nuts 6 and the washer 9 fastened to the upper locking member 5 are unfastened therefrom, the lower locking member 4 is unfastened, the worn probe 1 and the worn inner shoulder 2 are removed, a new probe 1 and a new inner shoulder 2 are assembled, the lower locking member 4 is fastened, and the two locking nuts 6 are fastened to the upper locking member 5 in order to prevent loosening of the lower locking member 4, whereby assembly is completed.

As is apparent from the above description, according to the present invention, it is possible to rapidly adjust the length of the probe, i.e. the length of the probe relative to the shoulder, at any time, whereby homogeneous friction stir welding and friction stir treatment are possible, and therefore, it is possible to improve weld quality.

In addition, the depth of the groove of the shoulder is adjustable at any time, whereby it is possible to derive optimum friction stir welding and friction stir treatment operation conditions, and therefore it is possible to greatly improve weld quality.

In the case in which critical dimensions are excessively changed as the result of wear of and damage to the shoulder and the probe due to continuous operations, it is possible to independently replace each component, and therefore it is possible to obtain an economic profit.

In the shape and assembly/fastening system of the shoulder and the probe, self-locking is possible instead of general thread fastening (it is difficult to process a high-hardness material). Consequently, it is possible to manufacture each of the shoulder and the probe using W-based cemented carbide, a Co alloy, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A friction stir welding tool with an adjustable probe length and shoulder groove depth, wherein
   a support shaft, made of a material having low thermal conductivity so as to inhibit thermal conduction between a probe and a shank, is coupled to a center of an upper locking member together with the shank,
   the probe, an inner shoulder, and an outer shoulder are coupled inside a lower part of the upper locking member, and a lower locking member is fastened and fixed to the lower part of the upper locking member in order to prevent separation of the probe, the inner shoulder, and the outer shoulder from the upper locking member, and
   a washer and a locking nut are fastened to an upper part of the lower locking member in order to prevent loosening of the lower locking member when the tool is rotated, whereby the locking nut pushes the lower locking member via the washer.

2. The friction stir welding tool according to claim 1, wherein plates having thicknesses of 1 mm or less are provided on a probe head and an inner shoulder head in order to adjust a length of each of the probe and the inner shoulder.

3. The friction stir welding tool according to claim 1, wherein a plurality of recesses is formed in a surface of the outer shoulder and a groove is formed between the inner shoulder and the probe in order to continuously introduce a material and to increase pushing force necessary for plastic flow of the material in an upward-downward direction during a friction stir welding operation.

4. The friction stir welding tool according to claim 1, wherein the probe, the inner shoulder, and the outer shoulder are processed in a self-locking structure so as to be assembled to the upper locking member, whereby the probe, the inner shoulder, and the outer shoulder are coupled to each other.

* * * * *